United States Patent [19]

Shiozawa et al.

[11] Patent Number: 4,678,312
[45] Date of Patent: Jul. 7, 1987

[54] ROTATABLE HEAD TYPE ELECTROPHOTOGRAPHIC APPARATUS, CORONA CHARGING ROTATABLE HEAD AND MOVEABLE ELECTROPHOTOGRAPHIC LIQUID DEVELOPMENT PROCESSING UNIT THEREFOR

[75] Inventors: Etuo Shiozawa; Shigeo Harada; Shuichi Ohtsuka; Masahiro Ohnishi, all of Kanagawa, Japan

[73] Assignee: Fuji Photo Film Co., Ltd., Japan

[21] Appl. No.: 635,069

[22] Filed: Jul. 27, 1984

[30] Foreign Application Priority Data

| Aug. 1, 1983 | [JP] | Japan | 58-140882 |
| Aug. 1, 1983 | [JP] | Japan | 58-140883 |
| Aug. 1, 1983 | [JP] | Japan | 58-140884 |
| Aug. 1, 1983 | [JP] | Japan | 58-140885 |

[51] Int. Cl.$^4$ .................................... G03G 15/00
[52] U.S. Cl. .................................... 355/3 R; 355/10; 346/108; 358/300
[58] Field of Search ............... 355/3 R, 3 CH, 10; 346/108, 160; 358/289, 290, 291, 300, 302, 292

[56] References Cited

U.S. PATENT DOCUMENTS

4,468,707  8/1984  Kuehnle et al. ................ 358/300

Primary Examiner—Arthur T. Grimley
Assistant Examiner—J. Pendegrass
Attorney, Agent, or Firm—Gerald J. Ferguson, Jr.; Michael P. Hoffman; Ronni S. Malamud

[57] ABSTRACT

A rotatable head type electrophotographic apparatus comprises a rotatable head supported on a moveable table and having a corona charging electrode and a light source secured thereto to face outwardly of the circumferential surface thereof. A development processing unit is supported on the moveable table close to a photosensitive material supported on a platen having a curved supporting surface. The light source is driven in accordance with a predetermined modulating signal to form an electrostatic latent image in the photosensitive material when the rotatable head is rotated and moved above the photosensitive material. The latent image is immediately developed by processing liquid flowing in the development processing unit along the surface of the photosensitive material.

12 Claims, 4 Drawing Figures

ROTATABLE HEAD TYPE ELECTROPHOTOGRAPHIC APPARATUS, CORONA CHARGING ROTATABLE HEAD AND MOVEABLE ELECTROPHOTOGRAPHIC LIQUID DEVELOPMENT PROCESSING UNIT THEREFOR

BACKGROUND OF THE INVENTION

1. Field of the Invention

This invention relates to a rotatable head type electrophotographic apparatus wherein an electrode for electrostatically charging the surface of an electrophotographic photosensitive material and a light source for emitting light to which the charged electrophotographic photosensitive material is exposed are mounted in the rotatable head.

2. Description of the Prior Art

There has heretofore been known electrophotography in which the surface of an electrophotographic photosensitive material is electrostatically charged and then exposed imagewise to light to form an electrostatic latent image thereon, and the electrostatic latent image is developed by adhering a toner by electric attraction to the surface of the electrophotographic photosensitive material.

On the other hand, a new image recording apparatus using a rotatable head is proposed, for example, in Japanese Unexamined Patent Publication No. 57(1982)-151933 (U.S. patent application Ser. No. 355,874, now U.S. Pat. No. 4,479,133). In the image recording apparatus, the rotatable head is fabricated by mounting a recording light emitting system in a rotatable body so as to emit recording light outwardly of the circumferential surface of the rotatable body. A recording material is secured to stand face to face with the circumferential surface of the rotatable head. The rotatable head is rotated and, at the same time, moved in the direction of the rotation axis thereof while recording light is emitted from the recording light emitting system to the recording material. Thus the recording material is two-dimensionally scanned by the recording light to record an image therein.

Since the aforesaid recording apparatus using the rotatable head for movement in the direction of the rotation axis thereof does not require an expensive device such as a light deflector, it can be fabricated at a cost lower than that of a recording apparatus wherein recording light is deflected by a light deflector such as a galvanometer mirror or a multi-face rotating mirror to scan on a recording material. Further, since the light path length from a condensing lens of the recording light emitting system to the recording material can be adjusted to shorten it, it is possible to record an image at high resolution and high brightness. Also, the rotatable head type recording apparatus is advantageous in that it can be made smaller than a recording apparatus wherein a platen supporting a recording material thereon is rotated for recording an image.

SUMMARY OF THE INVENTION

The primary object of the present invention is to provide a rotatable head type electrophotographic apparatus which is simple in configuration and small in size and which is fabricated at a low cost.

Another object of the present invention is to provide a rotatable head type electrophotographic apparatus which is free from dark decay of charges and produces an image of high quality at high resolution.

The specific object of the present invention is to provide a corona charging rotatable head which has a simple configuration and a small size and which is free from dark decay of charges.

A further object of the present invention is to provide a corona charging rotatable head which prolongs the service life of a corona charging electrode and which uniformly charges an electrophotographic photosensitive material.

A still further object of the present invention is to provide a moveable electrophotographic liquid development processing unit which is small and applicable also to large electrophotographic photosensitive material and which realizes uniform development.

Another object of the present invention is to provide a rotatable head type electrophotographic apparatus comprising a sheet bending and loading device which automatically loads an electrophotographic photosensitive material onto a curved supporting surface without the photosensitive material being scratched by the supporting surface.

The rotatable head type electrophotographic apparatus in accordance with the present invention comprises:

(i) a moveable table, (ii) a rotatable head comprising a rotatable body which is rotatably supported on said moveable table, a corona charging electrode secured to said rotatable body to face outwardly of the circumferential surface of said rotatable body, and an electrostatic latent image forming light source secured to said rotatable body to face outwardly of the circumferential surface of said rotatable body, (iii) a platen provided with an electrophotographic photosensitive material supporting surface extending in the axial direction of said rotatable head and curved to stand face to face with the circumferential surface of said rotatable head, (iv) a table movement means for moving said moveable table in the axial direction of said rotatable body, (v) an electrophotographic development processing unit supported on said moveable table close to an electrophotographic photosensitive material supported on said platen, (vi) a light source driving means for driving said light source in accordance with a predetermined modulating signal, and (vii) a light shielding member for shielding the electrophotographic photosensitive material from external light during charging, exposure and development.

In the present invention, the corona charging electrode is secured to the rotatable head which is rotated and moved for exposing an electrophotographic photosensitive material to light to record an image therein by scanning. Therefore, it is possible to uniformly charge the surface of the electrophotographic photosensitive material supported on the platen to stand face to face with the circumferential surface of the rotatable head. Since it is sufficient that the corona charging electrode be of the spot-wise charging type, a needle electrode is used as the corona charging electrode. Accordingly, the configuration of the charging mechanism becomes very simple, and consequently the electrophotographic apparatus becomes simple in configuration, small in size, and can be fabricated at a low cost. Uniform charging is achieved also by positioning a short wire electrode in the rotatable body in parallel with the moving direction of the moveable table or by using a multi-stylus type electrode. In the case where the degree of charging is insufficient, a plurality of the charging electrodes may be used to obtain a desired degree of charging. Further, since the charging electrode and the light source are secured to the rotatable head, it is possible to conduct exposure of the electrophotographic photosensitive material to light almost simultaneously with charging thereof. Also, since the development processing unit is supported together with the rotatable head on the moveable table, development is conducted immediately after exposure to light. Accordingly, the electrophotographic apparatus in accordance with the present invention is free from dark decay of charges and produces an image of high quality at high resolusion. Further, since the needle electrode having a simple configuration is used as the charging means, dust or dirt does not readily attach to the charging means, and maintenance of the apparatus becomes easy.

The present invention also provides a corona charging rotatable head comprising a rotatable body rotated by a driving means, a corona charging electrode secured to said rotatable body to face outwardly of the circumferential surface of said rotatable body, and an electrostatic latent image forming light source secured to said rotatable body to face outwardly of the circumferential surface of said rotatable body. The corona charging rotatable head is simple in configuration, small in size and fabricated at a low cost. Further, the corona charging rotatable head is simple to maintain since dust does not readily attach thereto, and exhibits prolonged service life since the electrode is free from breakage. Also, the rotatable head has many advantages as described above and is suitable for use in the rotatable head type electrophotographic apparatus.

Further, the present invention provides a moveable electrophotographic liquid development processing unit comprising:

(a) a processing liquid vessel having a processing liquid reservoir space defined by a back plate standing face to face with a surface of an electrophotographic photosensitive material and a side edge plate secured to said back plate, said side edge plate being positioned in slightly spaced relation to the surface of said electrophotographic photosensitive material, (b) a processing liquid inlet positioned at a part of said processing liquid vessel, (c) a processing liquid outlet positioned at a part of said processing liquid vessel in a position spaced away from said processing liquid inlet, (d) a processing liquid passage positioned outside of said processing liquid vessel for connecting said processing liquid outlet with said processing liquid inlet, (e) a processing liquid circulating pump positioned in said processing liquid passage for circulating the processing liquid inside of said processing liquid passage and said processing liquid vessel, and (f) a vessel movement means for moving said processing liquid vessel along the surface of said electrophotographic photosensitive material.

The processing liquid reservoir space defined only by the back plate and the side edge plate is opened to the outside of the treating liquid vessel, and the processing liquid vessel is positioned with the opened portion facing the surface of the electrophotographic photosensitive material. When toner liquid is introduced into the processing liquid reservoir space, it flows in contact with the surface of the photosensitive material. Therefore, an electrostatic latent image formed in the surface of the photosensitive material is uniformly developed by the toner liquid as in the case where the photosensitive material is dipped in the toner liquid. The liquid development processing unit of the present invention is applicable to various processings of the surface of the photosensitive material. For example, it can also be used for removing surplus toner clinging to the surface of the photosensitive material after toner development by rinsing liquid.

Also, since the processing liquid vessel is positioned in slightly spaced relation to the surface of the photosensitive material, it can be moved by the vessel movement means along the surface of the photosensitive material. Therefore, the liquid development processing unit of the present invention can also be applied to large photosensitive material. Since the processing liquid in the processing liquid vessel is forcibly circulated by the processing liquid circulating pump and does not become stagnant, it is possible to increase the speed of the development processing and also processing accompanying the development, such as the rinsing of the surface of the photosensitive material.

The present invention also relates to a rotatable head type electrophotographic apparatus provided with a sheet bending and loading device for loading the electrophotographic photosensitive material onto the curved supporting surface, the sheet bending and loading device comprising:

(a) a sheet suction means for sucking and holding at least near two end portions of the electrophotographic photosensitive material placed flatly, (b) a sheet bending means for bending the electrophotographic photosensitive material to a curvature larger than the curvature of said supporting surface by moving the electrophotographic photosensitive material so that said two end portions thereof come close to each other, (c) a sheet conveyance means for moving said sheet suction means holding the bent electrophotographic photosensitive material to convey the electrophotographic photosensitive material up to a position where the curvature axis of the electrophotographic photosensitive material becomes approximately parallel with the curvature axis of said supporting surface and the outer surface at the center of curvature of the electrophotographic photosensitive material stands face to face with said supporting surface, and then moving the electrophotographic photosensitive material toward said supporting surface until the outer surface at the center of curvature of the electrophotographic photosensitive material comes into contact with said supporting surface, and (d) a suction control means for releasing suction of the electrophotographic photosensitive material by said sheet suction means after the electrophotographic photosensitive material contacts said supporting surface.

When suction of the electrophotographic photosensitive material is released after the outer surface at the center of curvature thereof contacts with the supporting surface of the platen, the photosensitive material is shifted onto the supporting surface by the resiliency thereof or by air suction through air suction holes perforated in the supporting surface. At this time, since the outer surface at the center of curvature of the photosensitive material is in contact with the supporting surface, the photosensitive material shifts onto the supporting surface such that the contact portion with the supporting surface gradually increases from the center to the two end portions of the photosensitive material. Accordingly, the photosensitive material is not scratched by the supporting surface.

DESCRIPTION OF THE PREFERRED EMBODIMENT

The present invention will hereinbelow be described in further detail with reference to the accompanying drawings.

Figure 1:
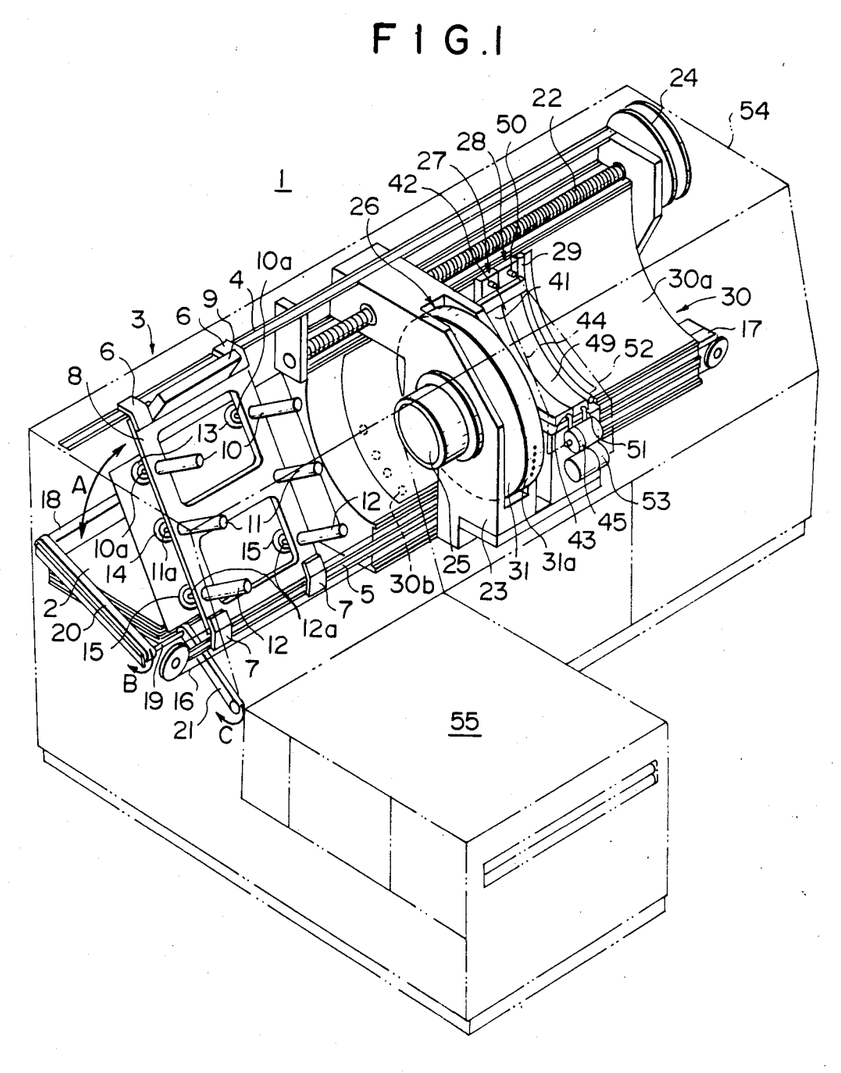
FIG. 1 is a perspective view showing an embodiment of the rotatable electrophotographic apparatus in accordance with the present invention.

FIG. 1 shows an embodiment of the rotatable head type electrophotographic apparatus in accordance with the present invention, which is applicable to the formation of an image pattern on the surface of a sheet-like printing plate material in a system for making an offset printing plate. Sheet-like photosensitive materials 2 are stacked at the left end section of a plate making apparatus 1. Each photosensitive material 2 comprises a resilient sheet such as an aluminium sheet, a resin layer which becomes soluble to a chemical agent upon exposure to ultraviolet rays and which is overlaid on the surface of the resilient sheet, and an electrophotographic photosensitive material layer overlaid on the surface of the resin layer. The photosensitive materials 2 are stacked at the aforesaid position with the electrophotographic photosensitive material layer facing up.

Figure 4:
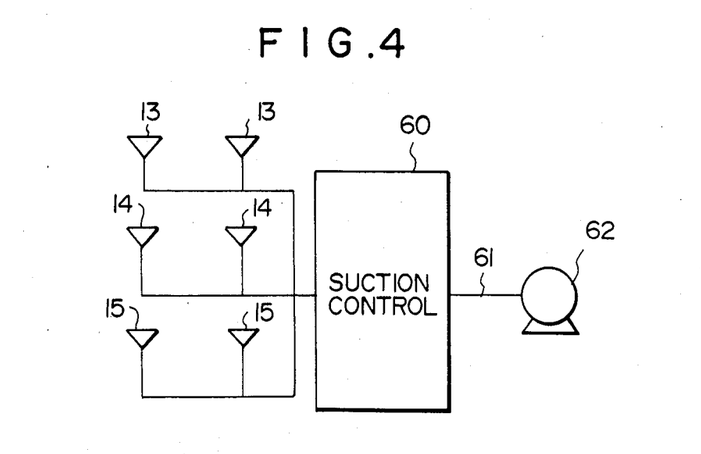
FIG. 4 is a schematic view showing the air circuit of the sheet suction means employed in the apparatus of FIG. 1.

Above the photosensitive materials 2 is positioned a photosensitive material loading device 3. The photosensitive material loading device 3 comprises a pair of rails 4 and 5 secured to the main body of the plate making apparatus 1 and extending in parallel with each other. Sliders 6 are positioned for movement along the upper rail 4, and sliders 7 are positioned for movement along the lower rail 5. A photosensitive material conveyor table 8 is mounted at its lower end portion on the lower sliders 7 by hinges so that the conveyor table 8 can be swung in the direction as indicated by the arrow A. A table swinging mechanism 9 is secured to the upper sliders 6 for supporting the upper end portion of the table 8 and swinging the table 8 in the direction as indicated by the arrow A. A pair of upper cylinders 10, a pair of middle cylinders 11, and a pair of lower cylinders 12 are secured to the photosensitive material conveyor table 8. The cylinders 10, 11, and 12 may, for example, be air cylinders. At the ends of piston rods 10a, 11a, and 12a of the cylinders 10, 11, and 12 are supported suction cups 13, 14 and 15. A table moving motor 17 is positioned for moving the photosensitive material conveyor table 8 along the rails 4 and 5 via an endless wire 16 supported on the lower sliders 7. Below the photosensitive material conveyor table 8 are positioned a pair of conveyor belts 20 for movement along a pair of slide shafts 18 and 19 parallel with the rails 4 and 5 and for rotation in the direction as indicated by the arrow B (only one of the conveyor belts 20 that is positioned below the left end portion of the photosensitive material conveyor table 8 is shown), and a pair of conveyor belts 21 positioned on the downstream side of the conveyance direction of the conveyor belts 20 and rotated in the direction as indicated by the arrow C (only one of the conveyor belts 21 that is positioned below the left end portion of the photosensitive material conveyor table 8 is shown). The suction cups 13, 14 and 15 are of the type conventionally used for sucking and holding a sheet. As shown in FIG. 4, the suction cups 13, 14 and 15 are connected to the suction side of an air pump 62 via an air passage 61 in which a suction control means 60 is positioned, thereby sucking the photosensitive material 2 by air suction. This point will later be described in further detail. The suction control means 60 comprises, for example, solenoid valves, and controls air suction from the suction cups 13, 14 and 15 by opening and closing the air passage 61. Of the suction cups 13, 14 and 15, the suction cups 13 supported on the upper cylinders 10 and the suction cups 15 supported on the lower cylinders 12 are pivotably supported on the end portions of the piston rods 10a and 12a.

Near the upper rail 4 is supported a screw rod 22 extending in parallel therewith. An upper portion of a moveable table 23 is engaged by threads with the screw rod 22. The screw rod 22 is rotated by a sub-scanning low-speed motor 24 positioned at the right end section of the plate making apparatus 1 to move the moveable table 23 along the screw rod 22. That is, a table movement means for moving the moveable table 23 in the axial direction of the screw rod 22 is constituted by the screw rod 22 and the motor 24.

On the moveable table 23 are mounted a rotatable head 26 rotated around a rotation shaft parallel with the screw rod 22 by a main scanning servo motor 25, a toner development unit 27, a rinsing unit 28, and an air knife 29. At a position standing face to face with the circumferential surface of the rotatable head 26 is secured a platen 30 having a photosensitive material supporting surface 30a in the form of a circular arc concentric with the rotatable head 26 and extending in the axial direction of the rotatable head 26.

Figure 2:
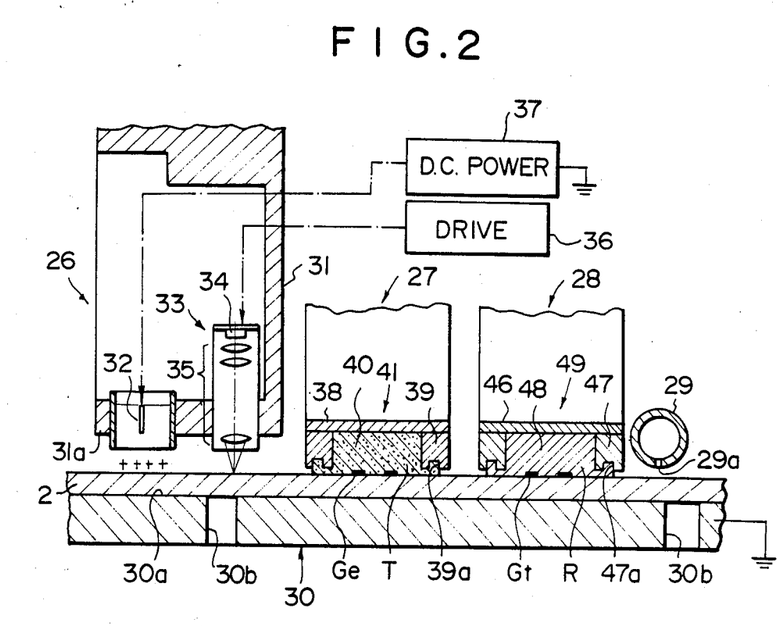
FIG. 2 is a sectional view showing a part of the apparatus of FIG. 1.

FIG. 2 shows in detail the mechanism mounted on the moveable table 23. As shown in FIG. 2, to a circumferential surface 31a of a rotatable body 31 constituting the main body of the rotatable head 26 are secured a single corona charging needle electrode 32 facing outwardly of the circumferential surface 31a, and a laser beam emitting system 33 acting as a light source and facing outwardly of the circumferential surface 31a in a position closer to the development unit 27 than is the needle electrode 32. The laser beam emitting system 33 comprises a semiconductor laser 34 for emitting a laser beam to the outside of the circumferential surface 31a of the rotatable body 31, and a condensing lens system 35. The semiconductor laser 34 is driven by a driving current modulated with a modulating signal which represents an image. The driving current is sent from a driving circuit 36. The needle electrode 32 is connected to a direct current power source 37. Electric connections between the needle electrode 32 and the direct current power source 37 and between the semiconductor laser 34 and the driving circuit 36 are achieved, for example, by use of slip rings and brushes for sliding in contact with the slip rings. It is also possible to transfer electric power via a rotary transformer in the non-contact manner and to transfer the signal via a rotary capacitor in the non-contact manner.

Figure 3:
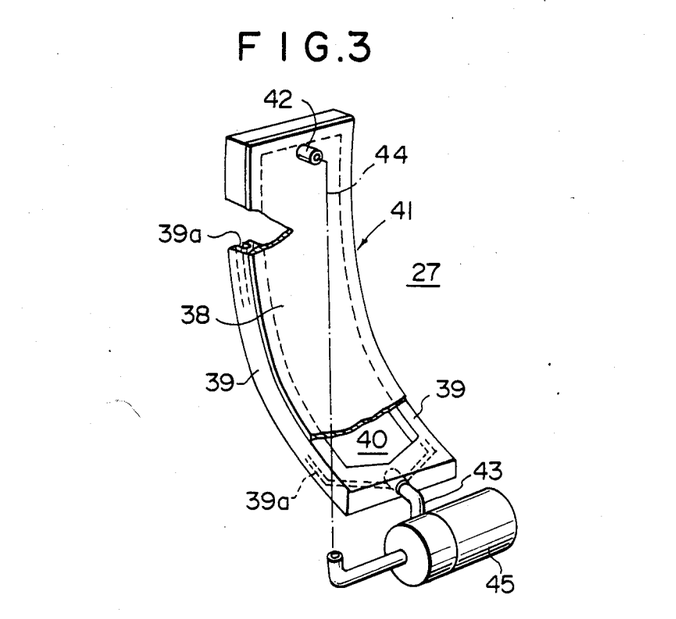
FIG. 3 is an enlarged partially cutaway perspective view showing a part of the apparatus of FIG. 1.

The toner development unit 27 comprises a toner liquid vessel 41 having a toner liquid reservoir space 40 defined by a curved back plate 38 standing face to face with the photosensitive material supporting surface 30a of the platen 30, and a side edge plate 39 protruded in the framelike form from the peripheral edge portion of the surface of the back plate 38 facing the platen 30. The toner development unit 27 also has a toner liquid inlet 42 positioned at the upper portion of the toner liquid vessel 41, a toner liquid outlet 43 positioned at the lower portion of the vessel 41, a toner liquid passage 44 positioned outside of the vessel 41 for connecting the toner liquid inlet 42 with the toner liquid outlet 43, and a toner liquid circulating pump 45 positioned in the toner liquid passage 44 for sending the toner liquid contained in the passage 44 from the toner liquid outlet 43 to the toner liquid inlet 42. The toner development unit 27 is shown in more detail in FIG. 3.

The rinsing unit 28 has the same configuration as that of the toner development unit 27. It comprises a rinsing liquid vessel 49 having a rinsing liquid reservoir space 48 defined by a back plate 46 and a side edge plate 47, a rinsing liquid inlet 50, a rinsing liquid outlet 51, a rinsing liquid passage 52, and a rinsing liquid circulating pump 53.

As shown in FIG. 2, the platen 30 has a plurality of air suction holes 30b opening to the photosensitive material supporting surface 30a and connected to the suction side of an air pump (not shown) via an air passage. When the photosensitive material 2 is positioned on the photosensitive material supporting surface 30a as will be described later, air is sucked from the air suction holes 30b to securely hold the photosensitive material 2 on the photosensitive material supporting surface 30a. The toner liquid vessel 41 and the rinsing liquid vessel 49 are positioned so that the side edge plates 39 and 47 thereof are slightly spaced from the photosensitive material 2 held on the photosensitive material supporting surface 30a. Also, in the surfaces of the side edge plates 39 and 47 are formed thin grooves 39a and 47a extending over the entire lengths in the longitudinal direction of the left and right portions of the respective side edge plates 39 and 47 and extending at the lower portions of the side edge plates 39 and 47 toward the centers of the vessels 41 and 49, thereby communicating with the toner liquid outlet 43 and the rinsing liquid outlet 51.

In FIG. 2, the air knife 29 is constituted by a pipe member extending vertically along the photosensitive material supporting surface 30a of the platen 30. One end of the air knife 29 is connected to the delivery side of a blower (not shown) for delivering hot air, and the other end thereof is closed. Through the circumferential surface of the air knife 29 standing face to face with the platen 30 is perforated a slit 29a extending over the entire length of the air knife 29 so that hot air supplied by the blower is emitted from the slit 29a onto the photosensitive material supporting surface 30a.

As shown in FIG. 1, the aforesaid mechanism is covered by a light shielding member 54 so that no external light enters the inside of the plate making apparatus 1. Also, a plate making unit 55 is spaced from the stacking position of the photosensitive materials 2 with the conveyor belts 21 intervening therebetween.

The plate making apparatus 1 constructed as described above is operated as described below. First, loading of the photosensitive material 2 onto the platen 30 will be described. The table moving motor 17 is first driven to move the sliders 6 and 7, and the photosensitive material conveyor table 8 of the photosensitive material loading device 3 is moved to the left end position as shown in FIG. 1, i.e. to the position above the stacked photosensitive materials 2. Then the table swinging mechanism 9 is driven, and the photosensitive material conveyor table 8 is swung downwardly in the direction as indicated by the arrow A around the hinge axes at which the conveyor table 8 is carried on the sliders 7. The conveyor table 8 is stopped at a position standing face to face above the uppermost photosensitive material 2. In this condition, the suction control means 60 opens the air passage 61 to start air suction from the suction cups 13, 14, and 15, and the uppermost photosensitive material 2 at the stacking position is sucked and held by the suction cups 13, 14, and 15. In the case where the number of the stacked photosensitive materials 2 is small and the height of the stack thereof is low, the cylinders 10, 11, and 12 supporting the suction cups 13, 14, and 15 are operated to extend the piston rods 10a, 11a, and 12a downwardly so that the suction cups 13, 14, and 15 come closer to the uppermost photosensitive material 2. In this case, the operation of the cylinders 10, 11, and 12 should preferably be stopped by detecting that the uppermost photosensitive material 2 is sucked up, or the length of extension of the piston rods 10a, 11a, and 12a should preferably be controlled in accordance with the number of the remaining photosensitive materials 2. After the uppermost photosensitive material 2 is sucked and held by the suction cups 13, 14, and 15, the table swinging mechanism 9 is driven reversely from the previous operation, and the photosensitive material conveyor table 8 is swung upwardly to the position as shown in FIG. 1. Then a pair of the middle cylinders 11 are activated to extend the piston rods 11a, and the photosensitive material 2 held obliquely is bent by the piston rods 11a so that the center of the photosensitive material 2 in the vertical direction thereof becomes farther from the conveyor table 8. At this time, a pair of the suction cups 13 and a pair of the suction cups 15 respectively positioned above and below the suction cups 14 are turned at the end portions of the piston rods 10a and 12a to allow the photosensitive material 2 to be bent. That is, the sheet bending means for bending the sheet-like photosensitive material 2 is constituted by the end portions of the piston rods 10a and 12a pivotably supporting the suction cups 13 and 15, and by the middle cylinders 11 for depressing the center of the photosensitive material 2. The piston rods 11a of the middle cylinders 11 are extended until the photosensitive material 2 is bent at a curvature larger than the curvature of the photosensitive material supporting surface 30a of the platen 30.

After the photosensitive material 2 is bent as described above, the table moving motor 17 is driven, and the photosensitive material conveyor table 8 is moved toward the platen 30 along the rails 4 and 5. At this time, the moveable table 23 is located at the waiting position at the right end of FIG. 1 close to the sub-scanning low-speed motor 24 and does not interfere with the movement of the photosensitive material conveyor table 8. The table moving motor 17 moves the conveyor table 8 until the photosensitive material 2 comes to the predetermined position above the platen 30, and is then stopped. To shorten the processing time, bending of the photosensitive material 2 by the extension of the piston rods 11a of the middle cylinders 11 may be conducted during the movement of the conveyor table 8 toward the platen 30 or during upward swinging of the conveyor table 8 by the table swinging mechanism 9. When the conveyor table 8 is stopped, the cylinders 10, 11, and 12 are activated to extend the piston rods 10a, 11a, and 12a at equal speeds, and the photosensitive material 2 is moved toward the photosensitive material supporting surface 30a of the platen 30 with the original curvature thereof maintained. The movement of the photosensitive material 2 is stopped when it contacts the photosensitive material supporting surface 30a. Since the photosensitive material 2 is bent at a curvature larger than the curvature of the photosensitive material supporting surface 30a as described above, the center of the photosensitive material 2 in the vertical direction first comes into contact with the photosensitive material supporting surface 30a. When the movement of the photosensitive material 2 is stopped, air suction from the air suction holes 30b perforated through the photosensitive material supporting surface 30a is started, and the suction control means 60 closes the air passage 61 to stop air suction from the suction cups 13, 14, and 15. As a result, the photosensitive material 2 is separated from the suction cups 13, 14, and 15, shifted onto the photosensitive material supporting surface 30a of the platen 30, and held at the predetermined position on the photosensitive material supporting surface 30a. The curvature of the photosensitive material 2 becomes small because of the resiliency thereof until the curvature becomes equal to the curvature of the photosensitive material supporting surface 30a, and the whole surface of the photosensitive material 2 is held on the photosensitive material supporting surface 30a. Since the center of the photosensitive material 2 first contacts with the photosensitive material supporting surface 30a and then the photosensitive material 2 is released from the suction cups 13, 14, and 15 as described above, the photosensitive material 2 comes into contact with the photosensitive material supporting surface 30a such that the portion in contact with the photosensitive material supporting surface 30a gradually increases from the center to the upper and lower end portions of the photosensitive material 2. Accordingly, the photosensitive material 2 is not scratched by the photosensitive material supporting surface 30a. Thus no scratch arises on the back surface of the photosensitive material 2 or on the photosensitive material supporting surface 30a.

When the photosensitive material 2 is supported on the photosensitive material supporting surface 30a of the platen 30 as described above, the cylinders 10, 11, and 12 contract the piston rods 10a, 11a, and 12a, and the photosensitive material conveyor table 8 is moved away from the platen 30 up to the left end position of FIG. 1. When the photosensitive material conveyor table 8 is retracted from the surface of the platen 30, the sub-scanning low-speed motor 24 is driven to rotate the screw rod 22, and the moveable table 23 waiting at the right end position of FIG. 1 is moved toward the photosensitive material conveyor table 8, i.e. leftwardly in FIG. 2, along the screw rod 22. At the same time, the main scanning servo motor 25 supported on the moveable table 23 is driven to rotate the rotatable head 26, and a high voltage is applied between the needle electrode 32 mounted in the rotatable head 26 and the photosensitive material 2. Further, the semiconductor laser 34 of the laser beam emitting system 33 is driven by the driving circuit 36. As the rotatable head 26 is rotated as described above, the needle electrode 32 is moved in the circumferential direction of the rotatable head 26 above the surface of the photosensitive material 2. Since the moveable table 23 is moved simultaneously, the needle electrode 32 is also moved in the direction of the curvature axis above the surface of the photosensitive material 2. Accordingly, the whole surface of the photosensitive material 21 is corona charged.

To the photosensitive material 2 charged as described above, a laser beam is emitted from the laser beam emitting system 33 which is rotated and moved together with the needle electrode 32. As a result, surface charges are dissipated from the portions of the surface of the photosensitive material 2 which are exposed to the laser beam, and surface charges at the portions which are not exposed to the laser beam remain undissipated, thereby forming an electrostatic latent image Ge as shown in FIG. 2. The electrostatic latent image Ge for forming a desired image can be obtained by driving the semiconductor laser 34 by the driving current modulated with an image signal as described above in conformity with the scanning in the main scanning direction by the rotation of the rotatable head 26 and the scanning in the sub-scanning direction by the axial movement of the rotatable head 26.

As shown in FIG. 2, the electrostatic latent image Ge thus formed is immediately developed by the toner development unit 27 moving together with the rotatable head 26. In the development unit 27, the toner liquid circulating pump 45 is activated as described above, and toner liquid T introduced from the toner liquid inlet 42 into the toner liquid vessel 41 naturally flows downwardly in the toner liquid reservoir space 40 and is drawn from the toner liquid outlet 43 to the outside of the vessel 41. The toner liquid T is then passed through the toner liquid passage 44 and returned to the vessel 41. Since the vessel 41 is opened toward the photosensitive material 2, the toner liquid T flows in contact with the photosensitive material 2 inside of the vessel 41. In this manner, the electrostatic latent image Ge is developed by the toner to form a toner image Gt. In this apparatus, since development is conducted by circulating the toner liquid T, the toner liquid T is uniformly distributed on the surface of the photosensitive material 2. Therefore, it is possible to achieve uniform development and shorten the development time. Further, since the charging needle electrode 32, the laser beam emitting system 33 as the light source, and the development unit 27 are moved integrally to conduct charging, exposure and development, the time required for the processes from the charging to the development becomes very short, and no significant dark decay of the charges arises.

In the toner development unit 27, since a thin groove 39a communicating with the toner liquid outlet 43 is provided in the surface of the side edge plate 39 of the toner liquid vessel 41, the toner liquid T forcibly flows in the thin groove 39a toward the toner liquid outlet 43 and does not leak to the outside of the vessel 41. It is possible to fabricate the vessel 41 standing face to face with the photosensitive material 2 by use of a conductive material so that the vessel 41 can act in the same manner as a development electrode.

In the rinsing unit 28 moved together with the toner development unit 27, rinsing liquid R is circulated to remove surplus toner liquid T clinging to the photosensitive material 2. In the rinsing unit 28, too, since the thin groove 47a is formed in the surface of the side edge plate 47, the rinsing liquid R does not leak from the rinsing liquid vessel 49.

The photosensitive material 2 rinsed by the rinsing liquid R is fixed by hot air jetted from the slit 29a of the air knife 29. The air knife 29 should preferably be activated continuously after the moveable table 23 is moved by a predetermined distance and development is finished until the moveable table 23 is returned to the waiting position at the right end of FIG. 1 for removing the photosensitive material 2 from the platen 30, thereby completely fixing the photosensitive material 2. Since the air knife 29 is supported at the position spaced from the rotatable head 26, hot air jetted from the air knife 29 does not scatter the rinsing liquid R or the like to the surface of the condensing lens system 35 of the laser beam emitting system 33 and stain the condensing lens system 35.

When the development, rinsing and fixing of the photosensitive material 2 are finished and the moveable table 23 is returned to the waiting position, the photosensitive material conveyor table 8 is moved up to a position standing face to face with the photosensitive material 2 on the platen 30. Thereafter, reversely to the operation sequence for loading the photosensitive material 2 onto the platen 30, the photosensitive material 2 is shifted from the platen 30 to the photosensitive material conveyor table 8. At this time, the photosensitive material 2 is separated from the platen 30 by the operation of the cylinders 10, 11, and 12 such that the upper and lower end portions of the photosensitive material 2 are first drawn toward the conveyor table 8 and only the center thereof is finally in contact with the photosensitive material supporting surface 30a. In this manner, the photosensitive material 2 is prevented from being scratched by the platen 30. The photosensitive material conveyor table 8 on which the photosensitive material 2 is held by the suction cups 13, 14, and 15 is returned to the left end portion as shown in FIG. 1. The pair of conveyor belts 20 spaced well apart from each other to allow the photosensitive material 2 to be removed from the stacking position are now moved closer to each other along the slide shafts 18 and 19 until the space between the conveyor belts 20 becomes slightly smaller than the width of the photosensitive material 2. Then air suction from the suction cups 13, 14 and 15 is stopped and the photosensitive material 2 is allowed to fall onto the conveyor belts 20. The photosensitive material 2 is then sent to the plate making unit 55 by the conveyor belts 20 driven in the direction as indicated by the arrow B and the pair of conveyor belts 21 driven in the direction of the arrow C.

In the plate making unit 55, the photosensitive material 2 developed by the toner is exposed, for example, to ultraviolet rays, and portions of the photosensitive material 2 which have no toner and therefore are exposed to the ultraviolet rays and rendered soluble are dissolved by a chemical agent, thereby forming concave portions in the surface of the photosensitive material 2. Then rinsing, gumming up, fixing, and the like are conducted to make an offset printing plate.

The aforesaid embodiment of the rotatable head type electrophotographic apparatus is used for recording a printing plate pattern in the printing plate making system. However, the apparatus of the present invention can also be constructed as an apparatus for obtaining a copy by transferring a toner image to paper. Also, instead of securing the platen 30, it is also possible to support the moveable table 23 and the platen 30 on a loop-like wire or steel belt so that they stand face to face with each other and to circulate the wire or the steel belt to move the moveable table 23 with respect to the platen 30, thereby shortening the movement strokes thereof.

Also, in the corona charging rotatable head 26, a single needle electrode 32 is used. However, it is also possible to use two or more electrodes.

Further, since charging and exposure are conducted by the rotatable head 26 and the photosensitive material 2 is supported on the curved surface of the platen 30, the toner liquid vessel 41 of the toner development unit 27 and the rinsing liquid vessel 49 of the rinsing unit 28 are fabricated in a curved shape. However, the liquid development processing unit is also applicable to an electrophotographic apparatus other than the rotatable head type. In this case, the toner liquid vessel 41 and the rinsing liquid vessel 49 are formed in a straight shape adapted to flat photosensitive materials. Also, the liquid development processing unit is advantageous even when the toner liquid vessel and the rinsing liquid vessel are moved independently from the charging means and the exposure means.

Further, it should be understood that the sheet bending and loading device used in the apparatus of the present invention is applicable to various other cases where a sheet is loaded onto a curved supporting surface.

We claim:

1. A rotatable head type electrophotographic apparatus comprising:
   (i) a moveable table,
   (ii) a rotatable head comprising a rotatable body which is rotatably supported on said moveable table, a corona charging electrode secured to said rotatable body to face outwardly of the circumferential surface of said rotatable body, and an electrostatic latent image forming light source secured to said rotatable body to face outwardly of the circumferential surface of said rotatable body,
   (iii) a platen provided with an electrophotographic photosensitive material supporting surface extending in the axial direction of said rotatable head and curved to stand face to face with the circumferential surface of said rotatable head,
   (iv) a table movement means for moving said moveable table in the axial direction of said rotatable body,
   (v) an electrophotographic development processing unit supported on said moveable table close to an electrophotographic photosensitive material supported on said platen,
   (vi) a light source driving means for driving said light source in accordance with a predetermined modulating signal, and
   (vii) a light shielding member for shielding the electrophotographic photosensitive material from external light during charging, exposure and development.

2. An apparatus as defined in claim 1 wherein said corona charging electrode is a needle electrode.

3. An apparatus as defined in claim 1 wherein said electrostatic latent image forming light source comprises a semiconductor laser and a condensing lens system.

4. An apparatus as defined in claim 1 wherein said table movement means comprises a screw rod engaged with said moveable table, and a low-speed motor for rotating said screw rod.

5. An apparatus as defined in claim 1 wherein said electrophotographic development processing unit comprises:

(a) a processing liquid vessel having a processing liquid reservoir space defined by a back plate standing face to face with a surface of an electrophotographic photosensitive material and a side edge plate secured to said back plate, said side edge plate being positioned in a slightly spaced relation to the surface of said electrophotographic photosensitive material, (b) a processing liquid inlet positioned at a part of said processing liquid vessel, (c) a processing liquid outlet positioned at a part of said processing liquid vessel in a position spaced away from said processing liquid inlet, (d) a processing liquid passage positioned outside of said processing liquid vessel for connecting said processing liquid outlet with said processing liquid inlet, (e) a processing liquid circulating pump positioned in said processing liquid passage for circulating the processing liquid inside of said processing liquid passage and said processing liquid vessel, and (f) a vessel movement means for moving said processing liquid vessel along the surface of said electrophotographic photosensitive material.

6. An apparatus as defined in claim 1 wherein said electrophotographic development processing unit comprises:

(a) a processing liquid vessel having a processing liquid reservoir space defined by a back plate standing face to face with a surface of an electrophotographic photosensitive material and a side edge plate secured to said back plate, said side edge plate being positioned in a slightly spaced relation to the surface of said electrophotographic photosensitive material, (b) a processing liquid inlet positioned at a part of said processing liquid vessel, (c) a processing liquid outlet positioned at a part of said processing liquid vessel in a position spaced away from said processing liquid inlet, (d) a thin groove formed in the surface of said side edge plate which stands face to face with said electrophotographic photosensitive material, said thin groove extending toward said processing liquid outlet, (e) a processing liquid passage positioned outside of said processing liquid vessel for connecting said processing liquid outlet with said processing liquid inlet, (f) a processing liquid circulating pump positioned in said processing liquid passage for forcibly circulating the processing liquid, and (g) a vessel movement means for moving said processing liquid vessel along the surface of said electrophotographic photosensitive material.

7. An apparatus as defined in claim 1, 5 or 6 wherein said electrophotographic development processing unit is provided with a means for emitting hot air for fixing an image on said electrophotographic photosensitive material.

8. A moveable electrophotographic liquid development processing unit comprising:

(a) a processing liquid vessel having a processing liquid reservoir space defined by a back plate standing face to face with a surface of an electrophotographic photosensitive material and a side edge plate secured to said back plate, said side edge plate being positioned in a slightly spaced relation to the surface of said electrophotographic photosensitive material, (b) a processing liquid inlet positioned at a part of said processing liquid vessel, (c) a processing liquid outlet positioned at a part of said processing liquid vessel in a position spaced away from said processing liquid inlet, (d) a processing liquid passage positioned outside of said processing liquid vessel for connecting said processing liquid outlet with said processing liquid inlet, (e) a processing liquid circulating pump positioned in said processing liquid passage for circulating the processing liquid inside of said processing liquid passage and said processing liquid vessel, and (f) a vessel movement means for moving said processing liquid vessel along the surface of said electrophotographic photosensitive material.

9. A moveable electrophotographic liquid development processing unit as defined in claim 8 wherein said unit is provided with a means for emitting hot air for fixing an image on said electrophotographic photosensitive material.

10. A moveable electrophotographic liquid development processing unit comprising:

(a) a processing liquid vessel having a processing liquid reservoir space defined by a back plate standing face to face with a surface of an electrophotographic photosensitive material and a side edge plate secured to said back plate, said side edge plate being positioned in a slightly spaced relation to the surface of said electrophotographic photosensitive material, (b) a processing liquid inlet positioned at a part of said processing liquid vessel, (c) a processing liquid outlet positioned at a part of said processing liquid vessel in a position spaced away from said processing liquid inlet, (d) a thin groove formed in the surface of said side edge plate which stands face to face with said electrophotographic photosensitive material, said thin groove extending toward said processing liquid outlet, (e) a processing liquid passage positioned outside of said processing liquid vessel for connecting said processing liquid outlet with said processing liquid inlet, (f) a processing liquid circulating pump positioned in said processing liquid passage for forcibly circulating the processing liquid, and (g) a vessel movement means for moving said processing liquid vessel along the surface of said electrophotographic photosensitive material.

11. A moveable electrophotographic liquid development processing unit as defined in claim 10 wherein said unit is provided with a means for emitting hot air for fixing an image on said electrophotographic photosensitive material.

12. A rotatable head type electrophotographic apparatus comprising:

(i) a moveable table, (ii) a rotatable head comprising a rotatable body which is rotatably supported on said moveable table, a corona charging electrode secured to said rotatable body to face outwardly of the circumferential surface of said rotatable body, and an electrostatic latent image forming light source secured to said rotatable body to face outwardly of the circumferential surface of said rotatable body, (iii) a platen provided with an electrophotographic photosensitive material supporting surface extending in the axial direction of said rotatable head and curved to stand face to face with the circumferential surface of said rotatable head, (iv) a table movement means for moving said moveable table in the axial direction of said rotatable body, (v) an electrophotographic development processing unit supported on said moveable table close to an electrophotographic photosensitive material supported on said platen, (vi) a light source driving means for driving said light source in accordance with a predetermined modulating signal, (vii) a light shielding member for shielding the electrophotographic photosensitive material from external light during charging, exposure and development, and (viii) a sheet bending and loading device for loading the electrophotographic photosensitive material onto the curved supporting surface of said platen, said sheet bending and loading device comprising:

(a) a sheet suction means for sucking and holding at least near two end portions of the electrophotographic photosensitive material placed flatly, (b) a sheet bending means for bending the electrophotographic photosensitive material to a curvature larger than the curvature of said supporting surface by moving the electrophotographic photosensitive material so that said two end portions thereof come close to each other, (c) a sheet conveyance means for moving said sheet suction means holding the bent electrophotographic photosensitive material to convey the electrophotographic photosensitive material up to a position where the curvature axis of the electrophotographic photosensitive material becomes approximately parallel with the curvature axis of said supporting surface and the outer surface at the center of curvature of the electrophotographic photosensitive material stands face to face with said supporting surface, and then moving the electrophotographic photosensitive material toward said supporting surface until the outer surface at the center of curvature of the electrophotographic photosensitive material comes into contact with said supporting surface, and (d) a suction control means for releasing suction of the electrophotographic photosensitive material by said sheet suction means after the electrophotographic photosensitive material contacts said supporting surface.

* * * * *